United States Patent
Ogawa et al.

(10) Patent No.: US 10,199,625 B2
(45) Date of Patent: Feb. 5, 2019

(54) BUS BAR INCLUDING THICK PORTION CONNECTED TO THIN PORTION BY BEND PORTIONS AND BATTERY MODULE INCLUDING THE SAME

(71) Applicant: KABUSHIKI KAISHA TOSHIBA, Minato-ku (JP)

(72) Inventors: Takaya Ogawa, Kawasaki (JP); Shinya Aikawa, Hamura (JP); Masato Iwata, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 211 days.

(21) Appl. No.: 14/979,642

(22) Filed: Dec. 28, 2015

(65) Prior Publication Data

US 2017/0005313 A1    Jan. 5, 2017

(30) Foreign Application Priority Data

Jun. 30, 2015  (JP) .................................. 2015-131624

(51) Int. Cl.
| | | |
|---|---|---|
| H01M 2/10 | (2006.01) | |
| H01M 2/20 | (2006.01) | |
| H02G 5/00 | (2006.01) | |
| H02G 5/06 | (2006.01) | |
| H01M 10/613 | (2014.01) | |

(Continued)

(52) U.S. Cl.
CPC ......... *H01M 2/202* (2013.01); *H01M 2/1016* (2013.01); *H01M 2/1022* (2013.01); *H01M 2/1072* (2013.01); *H01M 2/204* (2013.01); *H01M 2/206* (2013.01); *H01M 10/613* (2015.04); *H02G 5/002* (2013.01); *H02G 5/06* (2013.01); *H01M 10/6553* (2015.04); *H01M 10/6554* (2015.04)

(58) Field of Classification Search
CPC .... H01M 2/202; H01M 2/204; H01M 2/1072; H01M 2/1022; H01M 2/1016; H01M 2/2026; H01M 10/613; H02G 5/002; H02G 5/06
USPC .................................................. 429/158, 160
See application file for complete search history.

(56) References Cited

U.S. PATENT DOCUMENTS

| | | |
|---|---|---|
| 4,008,365 A | 2/1977 | Carlson |
| 6,723,924 B2 | 4/2004 | Yuasa et al. |
| 8,114,540 B2 | 2/2012 | Trester et al. |

(Continued)

FOREIGN PATENT DOCUMENTS

| | | |
|---|---|---|
| DE | 10 2012 100 882 A1 | 8/2013 |
| EP | 2 757 611 A1 | 7/2014 |

(Continued)

OTHER PUBLICATIONS

Werz Ulrich, Machine Translation of DE 10 2012 100 862 A1, Aug. 2013 (Year: 2013).*

(Continued)

*Primary Examiner* — Sean P Cullen
(74) *Attorney, Agent, or Firm* — Oblon, McClelland, Maier & Neustadt, L.L.P.

(57) ABSTRACT

A bus bar according to an embodiment includes a block-shape thick portion, two thin portions provided along the thick portion on both sides, and two bend portions that connect the thick portion and the thin portions, the connected thick portion and the thin portions being elastically deformable.

6 Claims, 6 Drawing Sheets

(51) Int. Cl.
*H01M 10/6553* (2014.01)
*H01M 10/6554* (2014.01)

(56) References Cited

U.S. PATENT DOCUMENTS

| | | |
|---|---|---|
| 2004/0166727 A1 | 8/2004 | Ling et al. |
| 2005/0070164 A1* | 3/2005 | Mita ............... H01M 2/204 439/627 |
| 2009/0274956 A1 | 11/2009 | Kosugi et al. |
| 2011/0177381 A1 | 7/2011 | Oya et al. |
| 2012/0231320 A1 | 9/2012 | Heck et al. |
| 2013/0029540 A1 | 1/2013 | Tong et al. |
| 2014/0057157 A1 | 2/2014 | Shimizu et al. |
| 2014/0205889 A1 | 7/2014 | Kim et al. |
| 2016/0049629 A1 | 2/2016 | Matsuda |

FOREIGN PATENT DOCUMENTS

| | | | |
|---|---|---|---|
| JP | 2005-317323 A | 11/2005 | |
| JP | 2007194035 A * | 8/2007 | .......... H01M 2/1077 |
| JP | 2009-87761 | 4/2009 | |
| WO | WO 2007/083697 A1 | 7/2007 | |
| WO | WO 2011/038908 A1 | 4/2011 | |
| WO | WO 2012/120821 A1 | 9/2012 | |
| WO | WO 2014/170957 A1 | 10/2014 | |

OTHER PUBLICATIONS

Kojima, Kazuo, Machine Translation of JP 2007-194035 A, Aug. 2007 (Year: 2007).*

Extended European Search Report dated Oct. 28, 2016 in Patent Application No. 15202389.1.

Office Action dated Jun. 30, 2016 in Australian Patent Application No. 2015275340.

Examination Report dated Dec. 20, 2016 in Australian Patent Application No. 2015282357.

U.S. Appl. No. 14/837,462, filed Aug. 27, 2015, Takaya Ogawa, et al.

U.S. Appl. No. 14/803,676, filed Jul. 20, 2015, Takaya Ogawa, et al.

Office Action dated Jun. 27, 2017 in Japanese Patent Application No. 2015-131624.

* cited by examiner

BUS BAR INCLUDING THICK PORTION CONNECTED TO THIN PORTION BY BEND PORTIONS AND BATTERY MODULE INCLUDING THE SAME

CROSS-REFERENCE TO RELATED APPLICATION

This application is based upon and claims the benefit of priority from Japanese Patent Application No. 2015-131624, filed Jun. 30, 2015, the entire contents of which are incorporated herein by reference.

FIELD

Embodiments described herein relate generally to a bus bar and a battery module that electrically connects terminals of a battery.

BACKGROUND

Bus bars electrically connect terminals of electrodes of, for example, a battery module of a secondary battery.

Bus bars that connect terminals of electrodes through which a large amount of current flows need a predetermined thickness to lower electrical resistance. On the other hand, bus bars need flexibility to maintain positional accuracy of the connecting terminals in order to handle impacts or heat from the outside, and distortion due to battery swelling.

In generally used bus bars, two terminal connecting parts are provided to a plank having a thickness capable of suppressing electrical resistance, and an arcuate bend part is provided between the two terminal connecting parts. With this configuration, the generally used bus bars retain low electrical resistance and have a certain degree of flexibility.

For the above-mentioned bus bars, there may be a gap between two terminals and terminal connecting parts due to a counterforce from the terminals to the load applied to the arcuate bend part when manufacturing. To avoid such a gap, there is a need for proficiency in welding terminals to terminal connecting parts.

Accordingly, the objective of the present embodiment is to provide a bus bar with low electrical resistance, low heat generation, and sufficient flexibility that can be easily manufactured at low cost, and to provide a battery module including such a bus bar.

DETAILED DESCRIPTION

Figure 1:
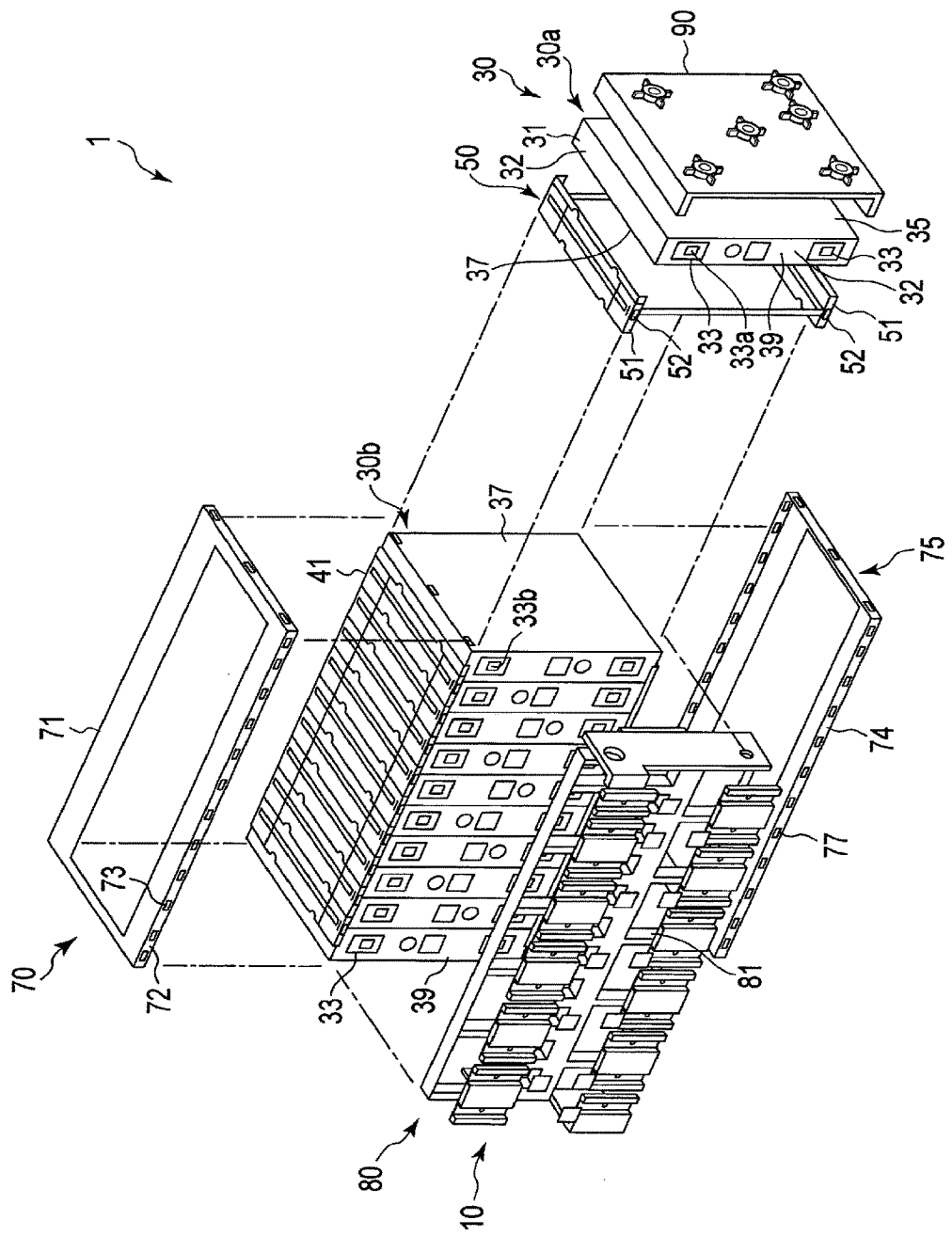
FIG. 1 is an exploded perspective view illustrating a battery module according to the present embodiment.

A bus bar according to an embodiment includes a block-shaped thick portion, two thin portions provided along the thick portion on both sides, a connection terminal portion provided at each thick portion, and two bend portions that connect the thick portion and the thin portions, the connected thick portion and the thin portions being elastically deformable.

A bus bar 10 according to the first embodiment will be described with reference to the drawings.

First, a battery module 1 to which the bus bar 10 is attached will be described with reference to FIG. 1.

The battery module 1 includes a plurality of cells 30, a plurality of separators 50, a plurality of bus bars 10, and a housing 70. The separators 50 are interposed between the adjacent battery cells 30. The bus bars 10 electrically connect the plurality of cells 30 together. The housing 70 immovably holds the plurality of cells 30 as one unit.

Each cell 30 includes a rectangular case 31. The case 31 includes a first surface 35 and a second surface 37 which are substantially square and are opposed to each other. The case 31 also includes four side surfaces 32 between the first surface 35 and the second surface 37.

One of the side surfaces 32 is a terminal surface 39, on which two electrode terminals 33 are provided. One of the two terminals 33 is a positive terminal, and the other terminal is a negative terminal. The case 31 is filled with a battery material and functions as a battery. For example, the cell 30 is a secondary cell.

In this embodiment, the cells 30 are arranged in such a manner that terminal surfaces 39 to which terminals 33 are oriented in the same direction, and the terminals 33 on the positive sides and negative sides are alternately arranged. In other words, the battery cells 30 are stacked in such a manner that the terminal surfaces 39 are oriented in the same direction, and adjacent cells are reversed by 180° so that the first surface 35 of a cell 30 faces the first surface 35 of an adjacent cell 30, and the second surface 37 of the cell 30 faces the second surface 37 of another adjacent cell 30. The separator 50 is an insulating frame having a rectangular shape interposed between two adjacent cells 30.

As shown in FIG. 1, the separator 50 has a rectangle shape having an inner circumference slightly larger than that of the first surface 35 of the cell 30 on both sides. The separator 50 fixes two adjacent cells 30 by engaging with them. The separator 50 is formed, for example, of an insulating resin material.

The housing 70 is a frame arranged to surround the plurality of cells 30 and separators 50. Specifically, in the present embodiment, the housing 70 has an upper-surface frame 71, a lower-surface frame 75, a terminal-side surface frame 80, and an end surface cover 90. The housing 70 encloses eleven cells 30, and ten separators 50 are engaged between the cells 30 to fix the cells. According to the present embodiment, the housing 70 is made of a metallic material. The housing 70 is not limited to the metallic material, but may be a resin, provided that the resin has a required mechanical strength.

The upper-surface frame 71 is rectangular and has a periphery greater than that of an upper surface 41 of the plurality of cells 30 arranged in parallel. The upper-surface frame 71 has a plurality of holes 73 in its side surface 72. The holes 73 are fitted with projections 52 formed at corner portions 51 of the separator 50.

Similarly, the lower-surface frame 75 is rectangular and has a periphery slightly greater than that of the lower surface of the plurality of cells 30 arranged in parallel. The lower-surface frame 75 has a plurality of holes 77 in its side surface 74. The holes 77 are fitted with the projections 52 formed at the corner portions 51 of the separator 50 to fix the lower-surface frame 75 to a lower surface not shown in the drawings.

That is, the plurality of cells 30 arranged in parallel are vertically sandwiched by the upper-surface frame 71 and the lower-surface frame 75.

The terminal-side surface frame 80 is arranged to face the terminal surface 39 of the cell 30. The terminal-side surface frame 80 has an opening portion 81 including a plurality of rectangular openings. The bus bars 10 are fixed via each opening of the opening portion 81.

As shown in FIG. 1, the bus bar 10 is a plate-like member that electrically connects the adjacent terminals 33 (for example, a positive terminal and a negative terminal) of the adjacent battery cells 30. That is, the bus bar 10 functions as part of an electrical circuit that connects the battery cells 30. The bus bar 10 is arranged in an opening of the opening portion 81 of the terminal-side surface frame 80 and is fixed to the terminals 33.

Figure 2:
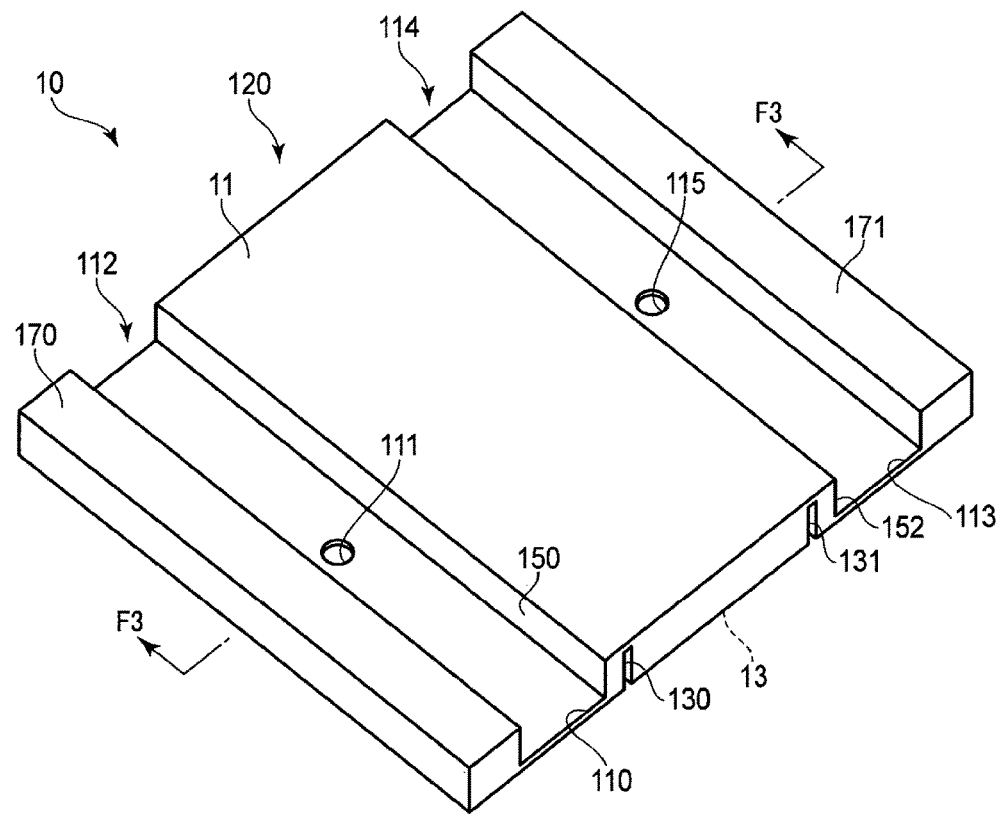
FIG. 2 is a perspective view showing a bus bar used in the battery module depicted in FIG. 1.
Figure 3:
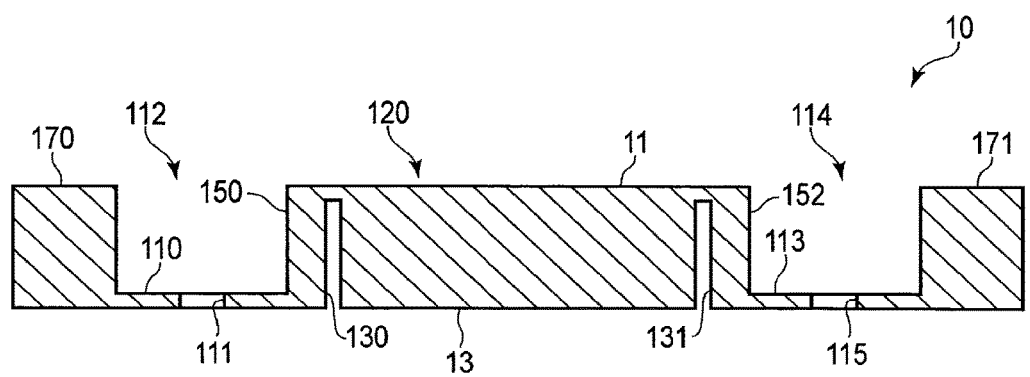
FIG. 3 illustrates a cross-sectional view of the bus bar, taken along line F3-F3.

The bus bar 10 has a configuration shown in FIGS. 2 and 3. FIG. 2 is a perspective view of the bus bar 10 according to the first embodiment. FIG. 3 illustrates a cross-sectional view of the bus bar depicted in FIG. 2, taken along line F3-F3.

As shown in FIG. 2, the bus bar 10 has a thick portion 120 having a plate-like shape, and a first thin portion 110 and a second thin portion 113 provided linearly and substantially parallel along both sides of the thick portion 120. In other words, the first thin portion 110 defines a bottom portion of a groove 112, and the second thin portion 113 defines a bottom portion of a groove 114. That is, in the present embodiment, the first thin portion 110 and the second thin portion 113 are located in line with a back surface 13 which is on one end of the thick portion 120 in the thickness direction.

The first thin portion 110 includes, for example, a first terminal connecting portion 111 that is connected to a first terminal 33a of a first cell 30a (see FIG. 1). The first terminal connecting portion 111 is formed to be thin to facilitate soldering or welding when being engaged with the first terminal 33a. The second thin portion 113 includes, a second terminal connecting portion 115 that is connected to a second terminal 33b of a second cell 30b (see FIG. 1) adjacent to the first cell 30a. The second terminal connecting portion 115 is formed to be thin to facilitate soldering or welding when being engaged with the second terminal 33b.

The first thin portion 110 and the second thin portion 113 cooperate with a first bend portion 150 and a second bend portion 152 described later to prevent the positions of the first terminal 33a and the second terminal 33b relative to the first terminal connecting portion 111 and the second terminal connecting portion 115 from being shifted.

As shown in FIG. 2, the thick portion 120 is formed integrally between the first thin portion 110 and the second thin portion 113. The thick portion 120 has higher heat capacitance than the first thin portion 110 and the second thin portion 113. The thick portion 120 is a plate-like portion having low electrical resistance.

As shown in FIG. 2, a first slit 130 cut from the back surface 13 (first surface) toward a front surface 11 (second surface) is provided along the groove 112 between the thick portion 120 and the first thin portion 110. A second slit 131 cut from the back surface 13 toward the front surface 11 is provided along the groove 114 between the thick portion 120 and the second thin portion 113.

In other words, as shown in FIG. 3, part of the first thin portion 110 adjacent to the thick portion 120 is bent in the substantially vertical direction, and is connected to the thick portion 120 via the first bend portion 150 in the upper portion. The connecting part between the first bend portion 150 and the thick portion 120 is formed to be thin and to have flexibility sufficient to be deformable along with the first thin portion 110.

Similarly, as shown in FIG. 3, part of the second thin portion 113 adjacent to the thick portion 120 is bent in the substantially vertical direction, and is connected to the thick portion 120 via the second bend portion 152 in the upper portion. The connecting part between the second bend portion 152 and the thick portion 120 is formed to be thin and to have flexibility sufficient to be deformable along with the second thin portion 113.

That is, the first and second bend portions 150 and 152 respectively extend from the portions of the first and second thin portions 110 and 113 adjacent to the thick portion 120 toward the front surface 11, and are connected at the corner portions of the thick portion 120 at the front surface 11 side.

The bus bar 10 according to the embodiment includes a first endothermic member 170 which is a thick portion different from the thick portion 120 along the side of the first thin portion 110 opposite to the side where the first bend portion 150 is provided. The bus bar 10 also includes a second endothermic member 171 which is a thick portion different from the thick portion 120 along the side of the second thin portion 113 opposite to the side where the second bend portion 152 is provided. In this embodiment, the first endothermic member 170 and the second endothermic member 171 are integrally formed with the thick portion 120, the first thin portion 110, the second thin portion 113, the first bend portion 150, and the second bend portion 152.

The first endothermic member 170 is a thick block-shaped portion provided along the first thin portion 110. The first endothermic member 170 absorbs heat generated when energized in order to suppress a local temperature increase of the bus bar 10.

The second endothermic member 171 is a thick block-shaped portion provided along the second thin portion 113. The second endothermic member 171 absorbs heat generated when energized in order to suppress the local temperature increase of the bus bar 10.

In the embodiment, the bus bar 10 is cut to the required length after being formed by extrusion forming, for example. The forming of the bus bar 10 is not limited thereto. For example, the bus bar 10 can be formed by cutting processing or pressing processing.

Figure 4:
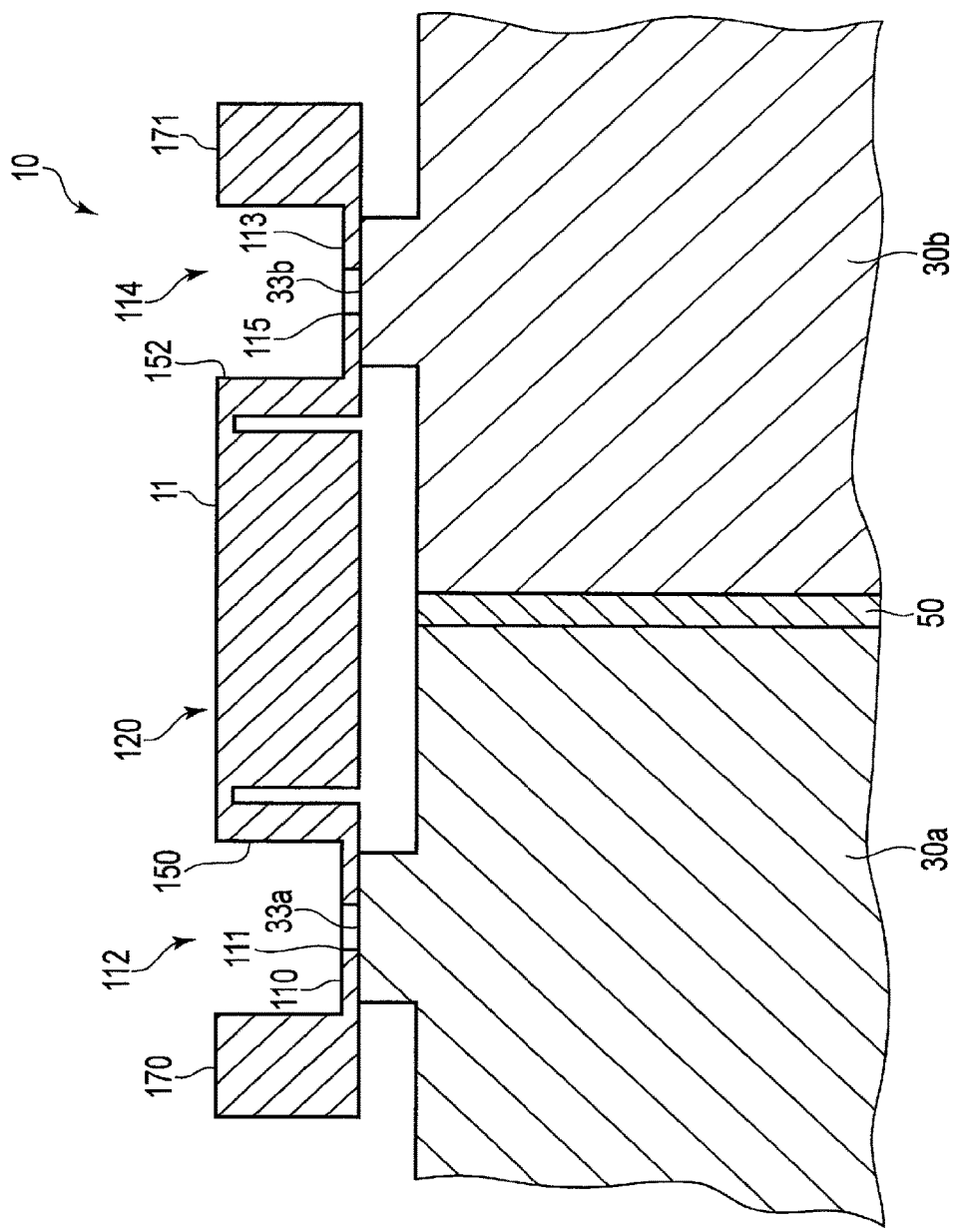
FIG. 4 is a cross-sectional view illustrating a state where the bus bar depicted in FIG. 2 is attached to the battery cell.

Next, the connection between the bus bar 10 and the terminal 33 (first terminal 33a, second terminal 33b) of the cell 30 (first cell 30a, second cell 30b) will be explained with reference to FIG. 4. FIG. 4 is a cross-sectional view illustrating a state where the bus bar 10 depicted in FIG. 2 is attached to the terminal 33. To simplify the connection between the terminal 33 and the bus bar 10, only the main members are depicted in FIG. 4, and the other members are omitted.

The bus bar 10 is arranged in one of the openings of the opening portion 81 of the terminal-side surface frame 80, as shown in FIG. 1. The bus bar 10 arranged on the terminal-side surface frame 80 is in contact with the terminal 33 provided on the terminal surface 39 of the cell 30.

Specifically, as shown in FIG. 4, the bus bar 10 is aligned by fitting the first terminal 33a of the first cell 30a into the first terminal connecting portion 111 having an opening, and fitting the second terminal 33b of the second cell 30b into the second terminal connecting portion 115 having an opening. Once the position of the bus bar 10 is fixed, the first terminal 33a and the second terminal 33b are respectively fixed into the first terminal connecting portion 111 and the second terminal connecting portion 115 by soldering, for example. The bus bar 10 having the above configuration can be securely fixed into the terminal 33.

Figure 5:
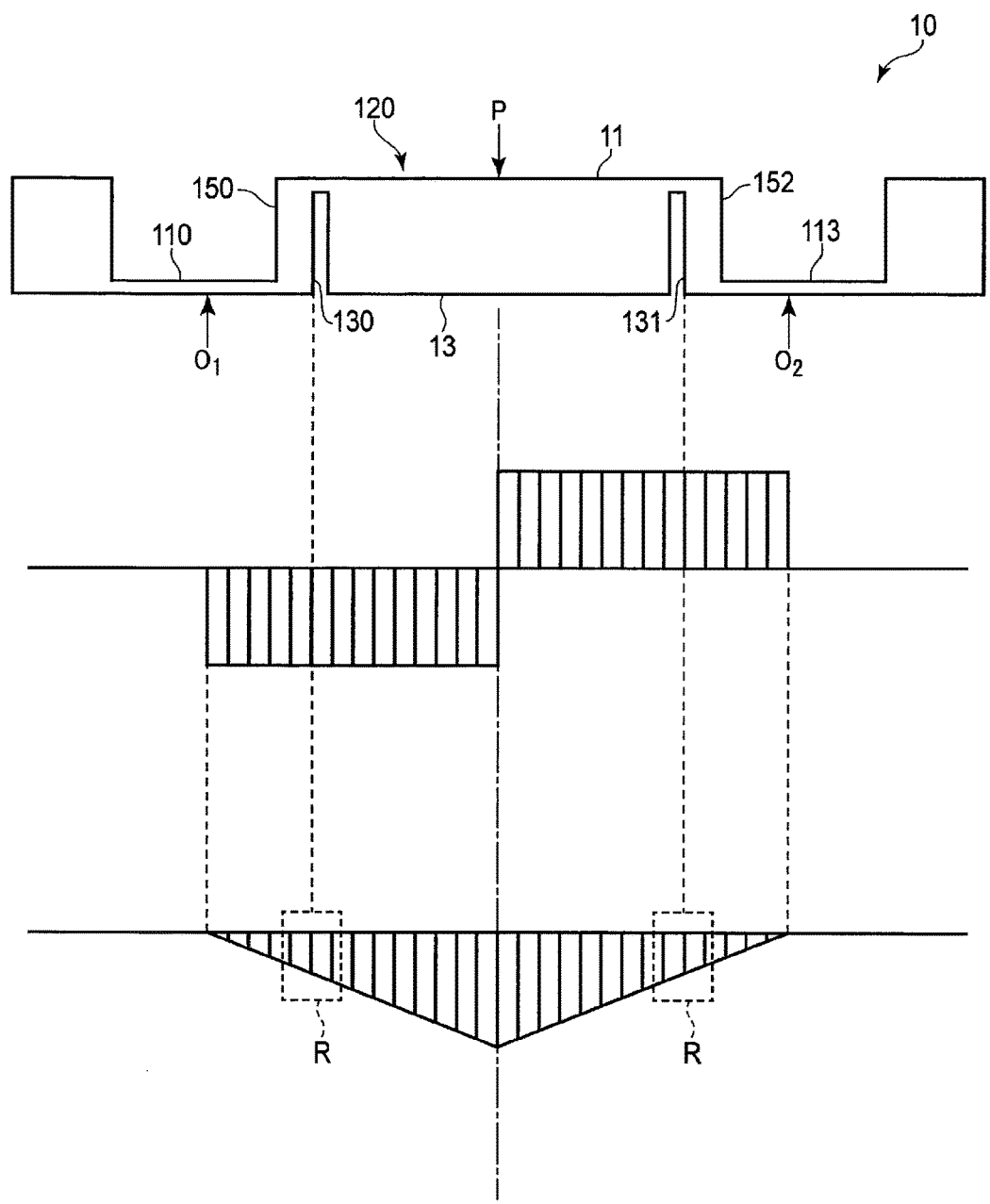
FIG. 5 illustrates a bending moment occurring when the bus bar depicted in FIG. 2 is attached to a terminal.
Figure 6:
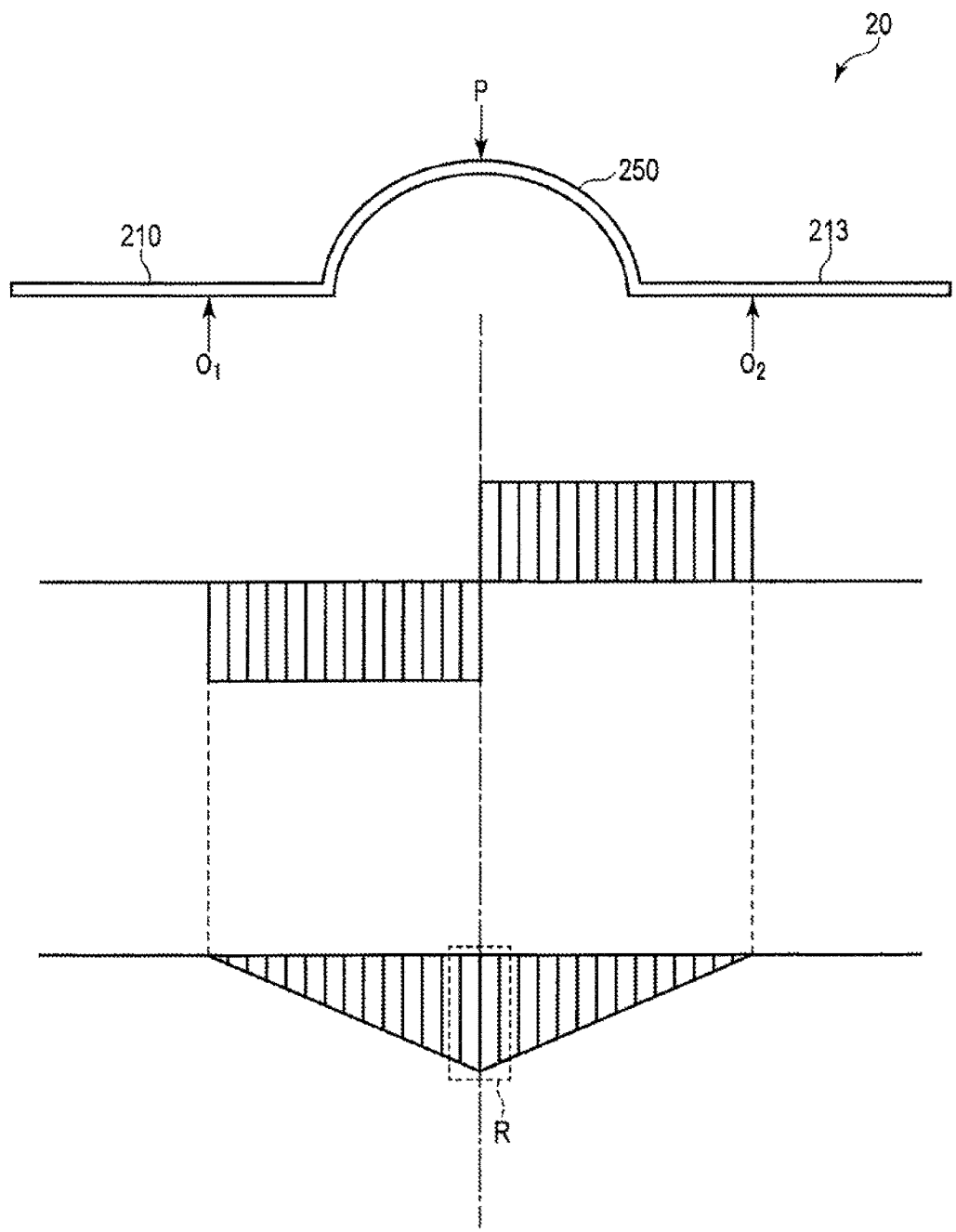
FIG. 6 illustrates a bending moment occurring when the conventional bus bar is attached to a terminal.

Next, the bus bar 10 according to the embodiment shown in FIG. 5 is compared with the conventional bus bar 20 shown in FIG. 6 in relation to the first bend portion 150 and the second bend portion 152. At the top of FIG. 5, load P applied when the bus bar 10 is fixed into the cell 30, and counterforce $0_1$ and $0_2$ from the terminal 33 to the load P are indicated with arrows. At the middle of FIG. 5, a shear force diagram (SFD) indicating shear load of the bus bar 10 depicted at the top of FIG. 5 is illustrated. At the bottom of FIG. 5, a bending moment diagram (BMD) indicating the bending moment of the bus bar 10 depicted at the top of FIG. 5 is illustrated.

At the top of FIG. 6, load P applied when the conventional bus bar 20 is fixed into the cell 30, and counterforce $0_1$ and $0_2$ from the terminal 33 to the load P are indicated by arrows. At the middle of FIG. 6, a shear force diagram (SFD) indicating the shear load of the bus bar 20 depicted at the top of FIG. 6 is illustrated. At the bottom of FIG. 6, a bending moment diagram (BMD) indicating the bending moment of the bus bar 20 depicted at the top of FIG. 6 is illustrated.

As shown at the top of FIG. 6, the conventional bus bar 20 is provided with a bend portion 250 which is an arcuate plank between a first plank portion 210 and a second plank portion 213 to ensure flexibility required to maintain electrode positional accuracy. In this configuration, if load P is applied at the top of the bend portion 250, the first plank portion 210 and the second plank portion 213 are bent (lifted up) due to the counterforce in the direction indicated by arrows $0_1$ and $0_2$, centered on the connecting part of the bend portion 250. If the first plank portion 210 and the second plank portion 213 are bent in the direction of the arrows $0_1$ and $0_2$, a gap between the terminal 33 and bus bar 20 or a misalignment may occur during manufacturing, thus becoming the cause of defective assembly.

As shown in the bending moment diagram of FIG. 6, the conventional bus bar 20 has the bend portion 250 having flexibility at the portion enclosed by a broken line R where the bending moment is highest. That is, as can be seen from the bending moment diagram, the bending moment is the highest at the portion where the bus bar 20 is most easily bent. Accordingly, there may be significant counterforce from the terminal in the conventional bus bar 20. Due to the counterforce, the first plank portion 210 is bent in the direction indicated by the arrow $0_1$, centered on the connecting part of the bend portion 250. In addition, the second plank portion 213 is bent in the direction indicated by the arrow $0_2$, centered on the connecting part of the bend portion 250.

In contrast, as shown in the top of FIG. 5, the bus bar 10 according to the embodiment is provided with the first slit 130 and the second slit 131 along both sides of the thick portion 120, and the first bend portion 150 and the second bend portion 152 outside of the slits. The state where a load P is applied at the center of the thick portion 120 will be explained.

As shown in the bending moment diagram of FIG. 5, the load P with the highest bending moment is applied to the thick structure having high rigidity against bending (thick portion 120). The first bend portion 150 and the second bend portion 152 that are easily bent are provided at both sides of the thick portion 120 enclosed by a broken line R where the bending moment is relatively low.

That is, the bus bar 10 has the first bend portion 150 and the second bend portion 152 with low rigidity against bending at the portions where the bending moment is lower than that applied to the center.

With the above configuration, the bus bar 10 can prevent the first thin portion 110 or the second thin portion 113 from being bent when the load P is applied toward the cell 30 from the front surface 11 at the center of the thick portion 120.

Accordingly, the bending moment applied to the first bend portion 150 and the second bend portion 152 of the bus bar 10 becomes low. This suppresses an occurrence of a gap between the bus bar 10 and the terminal 33 when manufacturing.

Figure 7:
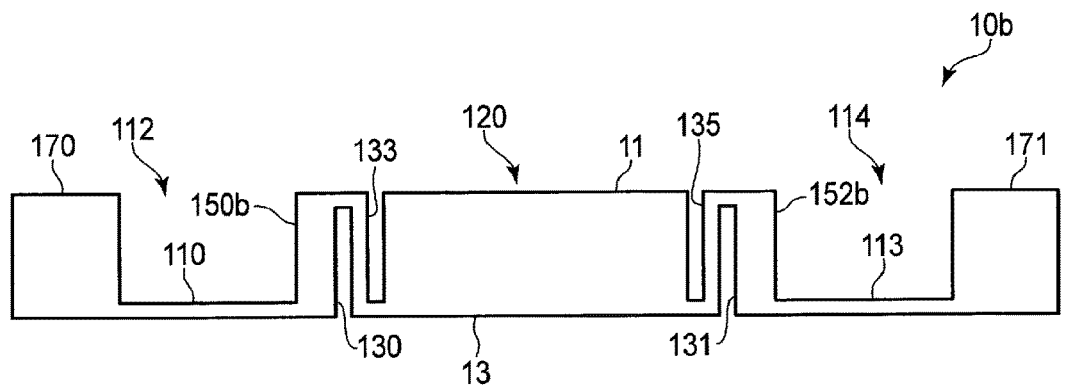
FIG. 7 is a side view of a first variation example of the bus bar.

The shapes of the first bend portion 150 and the second bend portion 152 are not limited to those explained in the embodiment. For example, as shown in FIG. 7, a bus bar 10b may be provided with four slits between the thick portion 120 and the first thin portion 110 and the second thin portion 113. Specifically, the bus bar 10b has a third slit 133 and a fourth slit 135 cut from the front surface 11 toward back surface 13 of the thick portion 120, in addition to the first slit 130 and the second slit 131. That is, the bus bar 10b is provided with a first bend portion 150b and a second bend portion 152b that have a wave-like shape at the center of the thick portion 120. Specifically, the first and second bend portions 150b and 152b respectively extend from the portions of the first and second thin portions 110 and 113 adjacent to the thick portion 120 from the back surface 13 toward the front surface 11, are folded at the same height as the front surface 11, and are connected to the thick portion 120 at the portions where the first thin portion 110 and the second thin portion 113 are adjacent to the thick portion 120.

Figure 8:
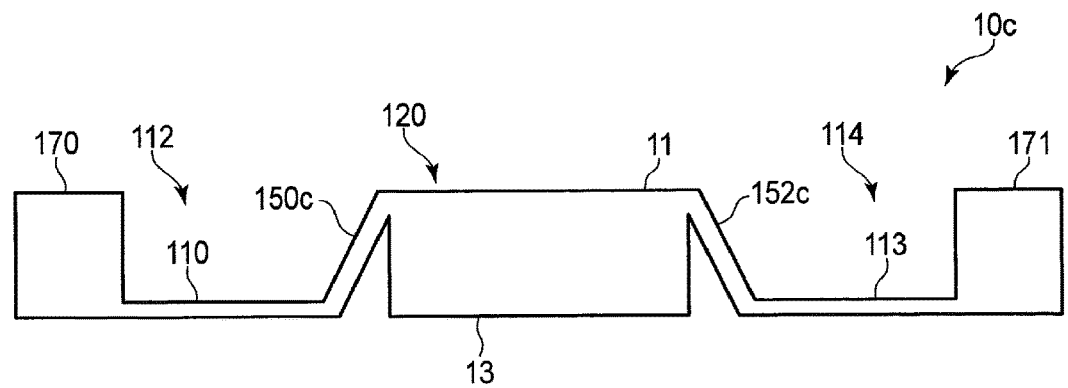
FIG. 8 is a side view of a second variation example of the bus bar.

FIG. 8 illustrates a bus bar 10c which is a second variation example. The bus bar 10c is provided with a first bend portion 150c and a second bend portion 152c that connect the first thin portion 110 and the second thin portion 113 to the thick portion 120. The first bend portion 150c and the second bend portion 152c are inclined walls having a predetermined inclination that are connected to the edge of the thick portion 120.

As explained above, the bus bar 10 according to the embodiment is provided with the thick portion 120. With this configuration, the bus bar 10 can reduce the electrical resistance at the thick portion 120 even if a large amount of current such as 100 amperes to several hundred amperes flows over several tens of seconds, for example. In addition, the thick portion 120 has a sufficient thickness to realize high rigidity against bending. The thick portion 120 can absorb heat generated near the first terminal connecting portion 111 or the second terminal connecting portion 115 that has relatively higher electrical resistance in comparison with the thick portion 120. With this configuration, the thick portion 120 can suppress a temperature increase of the first terminal connecting portion 111 or the second terminal connecting portion 115.

Furthermore, the bus bar 10 according to the embodiment has the first endothermic member 170 and the second endothermic member 171 that have substantially the same thickness as the thick portion 120. Accordingly, the bus bar 10 can apply to the thick portion 120 heat that is generated due to a large amount of current being supplied, and can also absorb the heat at the first endothermic member 170 and the second endothermic member 171.

For the conventional bus bar 20 as shown in FIG. 6, there may be a gap between two terminals and terminal connecting parts due to counterforce from the terminals to the load P applied to the arcuate bend portion 250 during manufacturing. There is a need for proficiency in welding terminals to terminal connecting parts without a gap or misalignment.

In contrast, as shown in FIG. 5, the bus bar 10 according to the embodiment is provided with the first slit 130 and the second slit 131 along both sides of the thick portion 120, and the first bend portion 150 and the second bend portion 152 that have low rigidity against bending are outside of the slits.

The first bend portion 150 and the second bend portion 152 are provided at the position where the bending moment is lower than the center, as shown in the bending moment diagram of FIG. 5. With the above configuration of the bus bar 10, it can suppress the occurrence of bending (warping) at the first thin portion 110 or the second thin portion 113 when the load P is applied toward the cell 30 from the front surface 11 at the center of the thick portion 120.

As a result, a gap or misalignment does not occur between the first terminal 33a and the first thin portion 110, or between the second terminal 33b and the second thin portion 113. Namely, the bus bar 10 according to the embodiment prevents the occurrence of a gap or misalignment between the first terminal 33a and the first thin portion 110 or between the second terminal 33b and the second thin portion 113, thereby facilitating manufacturing with high positional accuracy.

In addition, the bus bar 10 according to the embodiment includes the first thin portion 110, the second thin portion 113, the first bend portion 150, and the second bend portion 152. With this configuration, if the distance between adjacent terminals varies due to expansion of the cell 30, for example, the first thin portion 110, the second thin portion 113, the first bend portion 150, and the second bend portion 152 that are formed to be thin are deformed to resolve the shift of relative position. Furthermore, the bus bar 10 according to the embodiment having a shape as shown in FIG. 2, for example, can be easily manufactured by extrusion processing. Accordingly, it is possible to accomplish mass-production and control manufacturing costs.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The bus bar 10 according to the embodiment is used to electrically connect two adjacent cells 30 arranged in parallel; however, the usage is not limited thereto. For example, the bus bar can be used to integrally connect a plurality of adjacent battery cells.

What is claimed is:

1. A bus bar comprising:
    a block-shaped thick portion;
    two thin portions provided at both ends in one direction of the thick portion, respectively, and extending along the thick portion in a direction orthogonal to the one direction, the two thin portions being thinner than the thick portion, each of the two thin portions having a terminal connecting portion that is fixed to a terminal, the two thin portions being provided integrally to the thick portion;
    the terminal connecting portions each provided to the thin portions;
    two bend portions elastically and deformably connecting the thick portion to the two thin portions, each of the two bend portions being formed by a slit formed in a shape that is provided to each of sides of the thick portion along a direction in which the two thin portions extend, and is cut from a first surface toward a second surface of the thick portion, the second surface being opposite to the first surface; and
    an endothermic member provided for each of the two thin portions, the endothermic member being disposed on a side opposite to a side where said each of the two thin portions is connected to a corresponding one of the bend portions,
    wherein the thick portion, the thin portions, and the bend portions are integrally formed of a same material.

2. The bus bar according of claim 1, wherein the two thin portions are arranged along the first surface, the first surface being one end of the thick portion in a thickness direction; and
    the bend portions each extend from a position of the first surface where each of the two thin portions and the thick portion are adjacent toward the second surface of the thick portion, wherein the bend portions are formed in a shape that is folded at least once, and are connected to the thick portion adjacent to the respective thin portions.

3. The bus bar according of claim 1, wherein
    one of the terminal connecting portions is
    connected to the terminal provided to a first cell among a plurality of cells, and
    another of the terminal connecting portions is connected to the terminal provided to a second cell that is different from the first cell.

4. The bus bar according of claim 1, wherein the two thin portions are arranged along the first surface, the first surface being one end of the thick portion in a thickness direction; and
    the two bend portions each extend from a position of the first surface, where a respective one of the two thin portions and the thick portion are adjacent toward the second surface of the thick portion, and wherein the two bend portions are connected to the thick portion on the second surface.

5. The bus bar according of claim 4, wherein the bend portions are inclined walls that are inclined relative to the first surface on which the thin portions and the thick portion are connected.

6. A battery module comprising:
    a plurality of cells each comprising a plurality of terminals;
    a frame enclosing the plurality of cells; and
    a bus bar according to claim 3.

* * * * *